United States Patent
McDysan et al.

(10) Patent No.: US 8,745,125 B2
(45) Date of Patent: Jun. 3, 2014

(54) ROUTING TRAFFIC AFTER POWER FAILURE

(75) Inventors: David E. McDysan, Great Falls, VA (US); Stevan H. Leiden, Norwood, MA (US); Daniel J. O'Callaghan, Fairfax Station, VA (US); Douglas M. Pasko, Bridgewater, NJ (US); John Edward Rathke, Southborough, MA (US); Naseem A. Khan, Oak Hill, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 238 days.

(21) Appl. No.: 13/217,815

(22) Filed: Aug. 25, 2011

(65) Prior Publication Data

US 2013/0054493 A1 Feb. 28, 2013

(51) Int. Cl.
*G06F 15/16* (2006.01)
*H04L 29/08* (2006.01)
*H04L 29/00* (2006.01)

(52) U.S. Cl.
CPC .................. *H04L 29/08* (2013.01); *H04L 29/00* (2013.01)
USPC ........................................................ 709/202

(58) Field of Classification Search
CPC .............................. H04L 29/08; H04L 29/00
USPC ............................................ 705/1.1; 709/202
See application file for complete search history.

(56) References Cited

U.S. PATENT DOCUMENTS 7,047,300 B1 * 5/2006 Oehrke et al. ................ 709/226
2005/0185959 A1 * 8/2005 Kinoshita et al. .............. 398/59

OTHER PUBLICATIONS

Greenberg, Albert, "Networking The Cloud", Microsoft Research, 2009, pp. 1-45.

* cited by examiner

*Primary Examiner* — Allen J Jung

(57) ABSTRACT

A device, of a first data center, detects a power failure associated with the first data center when the first data center stops receiving power. The device further identifies a second data center for traffic to be processed by the first data center. The device also receives the traffic and routes the traffic to the second data center.

19 Claims, 9 Drawing Sheets

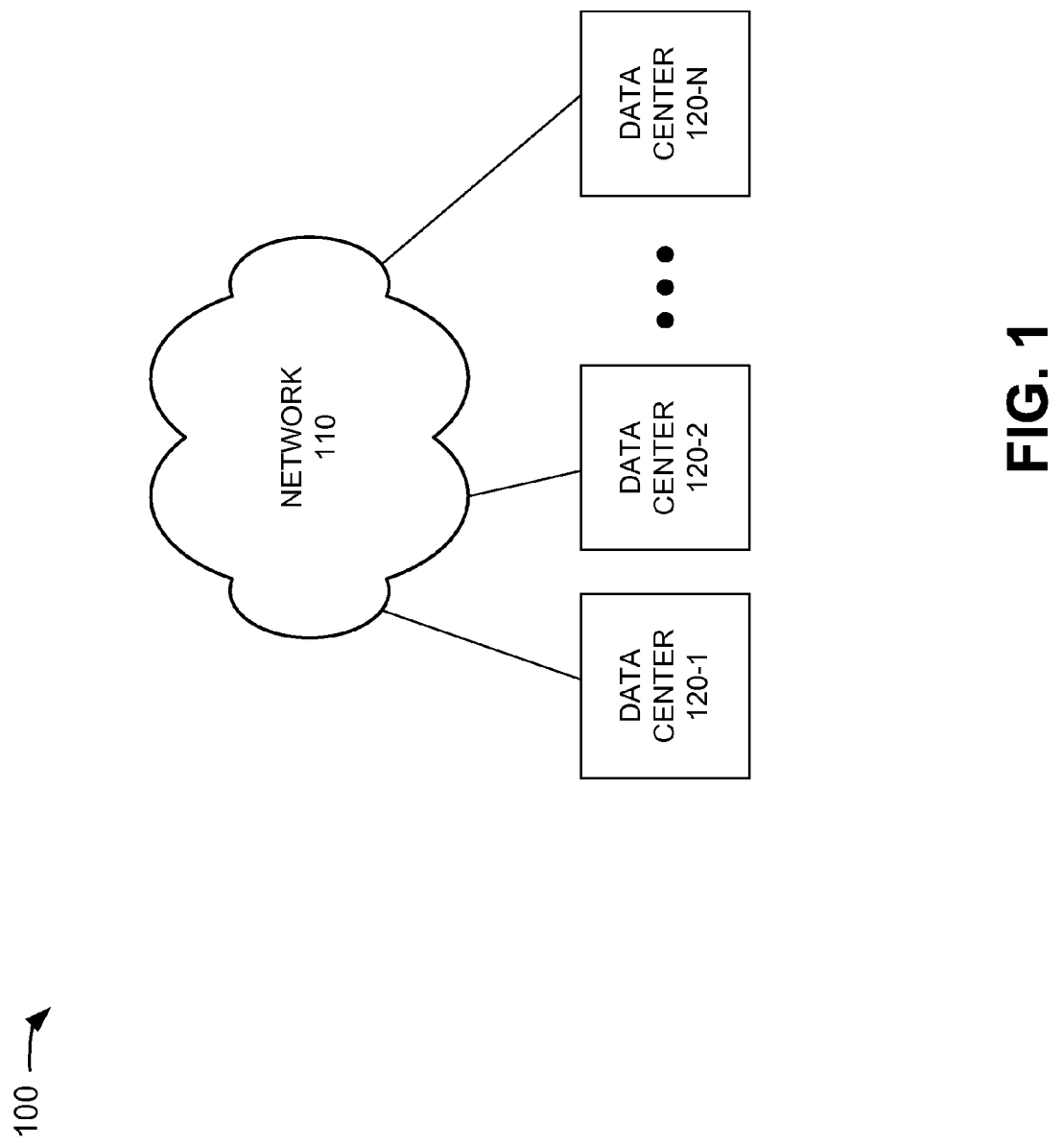

ROUTING TRAFFIC AFTER POWER FAILURE

BACKGROUND

Currently, data centers often process traffic independently from one another. Accordingly, an operator of a data center needs to ensure that the data center is able to continue to process any traffic received by the data center even when a commercial power failure occurs (e.g., when the data center stops receiving commercial power from a commercial power supplier during a snow storm). To do so, the operator provides redundant power supplies, including multiple backup power supplies (e.g., a battery power supply, a generator power supply, etc.), for all elements of the data center. The operator of the data center needs to expend considerable resources to provision and operate the multiple backup power sources (e.g., build power plants) that can provide sufficient power for all the elements when the commercial power failure occurs.

During a power failure, other data centers, of the operator, that are located in different locations (e.g., connected to different power grids) may continue to receive commercial power and have unused processing capacity. Furthermore, an operator of data centers often pays varied prices, which vary based on geography and/or time of day, for commercial power used by the data centers. Currently, the operator is unable to adjust which ones of the data centers process traffic in order to minimize energy costs.

BRIEF DESCRIPTION OF THE DRAWINGS

FIG. 1 is a diagram of an example environment in which systems and/or methods described herein may be implemented;

DETAILED DESCRIPTION OF PREFERRED EMBODIMENTS

Figure 2A:
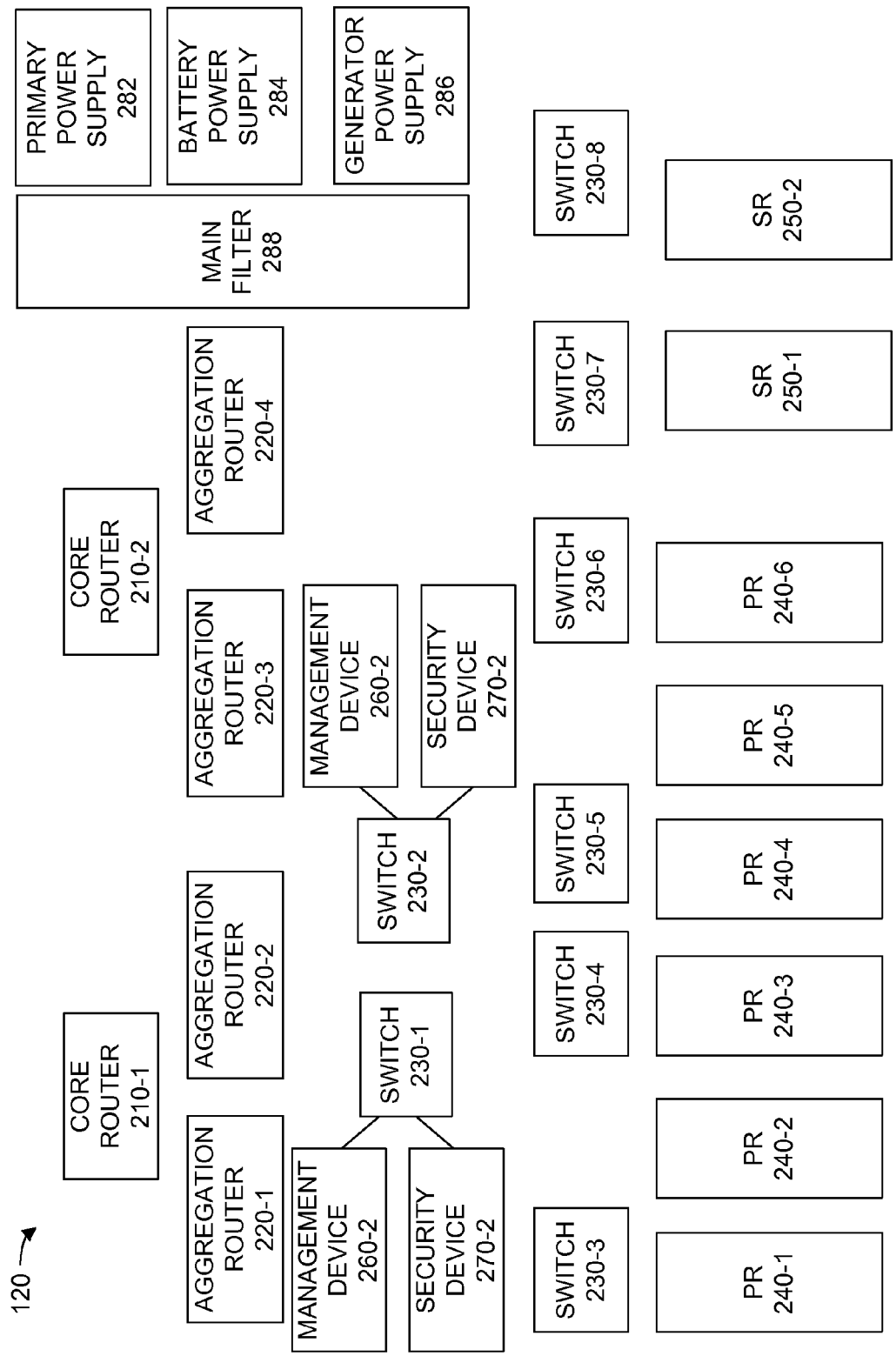
FIGS. 2A and 2B are diagrams of example components of a data center of FIG. 1.

The following detailed description refers to the accompanying drawings. The same reference numbers in different drawings may identify the same or similar elements.

According to an implementation, described herein, a management device of a data center may divide elements (e.g., routers, switches, processing devices, etc.) of the data center into different categories. A first category, of the different categories, may include only essential elements (e.g., core routers, load balancers, firewalls, etc.) of the data center. Only the essential elements in the first category, and no other elements in the other categories, may receive power from a commercial power supply, a first backup power supply (e.g., a battery power supply), and a second backup power supply (e.g., a generator power supply). Elements in a second category, of the different categories, may only receive power from the commercial power supply and the first backup power supply. Elements in a third category, of the different categories, may only receive power from the commercial power supply.

When the management device detects a power failure (e.g., the data center stops receiving commercial power via the commercial power supply), the management device may distribute processes being executed by the data center to other data centers that are continuing to receive commercial power. The essential elements may reroute traffic associated with the distributed processes to the other data centers. When the management device determines that the power failure has ended (e.g., the data center is, again, receiving the commercial power from the commercial power supply), the management device may reroute the traffic associated with the processes back to internal processing devices of the data center.

FIG. 1 is a diagram of an example environment 100 in which systems and/or methods described herein may be implemented. As shown in FIG. 1, environment 100 may include one or more of the following elements: a network 110 and data centers 120-1, 120-2, . . . , 120-N (collectively referred to as "data centers 120" and individually as "data center 120"). One or more of the elements of environment 100 may interconnect via wired and/or wireless connections. In practice, environment 100 may include additional elements, fewer elements, different elements, or differently arranged elements than are shown in FIG. 1. Also, one or more elements of environment 100 may perform the tasks described as being performed by one or more other elements of environment 100.

Network 110 may include one or more wired and/or wireless networks. For example, network 110 may include a direct connection, a cellular network, a public land mobile network (PLMN), a local area network (LAN), a wide area network (WAN), a metropolitan area network (MAN), an intranet, the Internet, an ad hoc network, an Internet protocol (IP)-based network, a fiber optic-based network (e.g., a FiOS network), and/or a combination of these or other types of networks.

Data center 120 may represent a facility that is used to house communication elements (e.g., routers, switches, etc.), commercial processing devices, commercial storage devices, commercial power storage systems, and/or other associated elements that data center 120 may use to process traffic received from clients (e.g., remote personal computers of customers) via network 110. In one example implementation, data center 120 may provide processing for different web services. For example, data center 120 may execute applications to provide information to client email programs, provide video-on-demand services (e.g., video sessions, etc.), provide video conferencing bridges, provide local services associated with particular geographic areas, provide software environments to execute customer application software, provide network-based storage systems to store customer data, etc. For some services, only a single data center 120 (e.g., data center 120-1) may execute one or more instances of an application, to provide a service, at a particular point in time. For other services, multiple data centers 120 (e.g., data centers 120-1, 120-2, and 120-3) may execute multiple instances of a particular application at the same time.

Figure 2B:
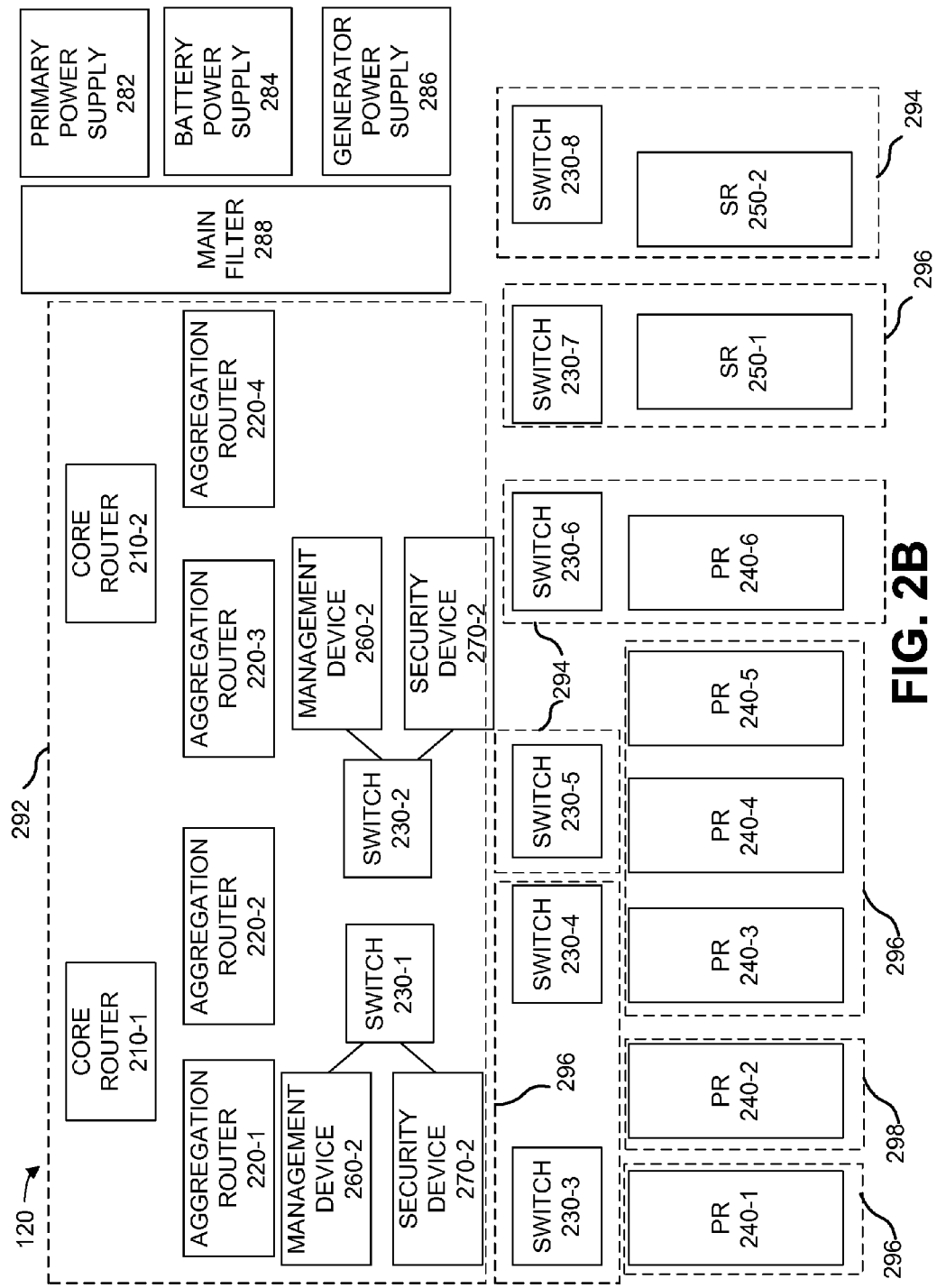

FIGS. 2A and 2B are diagrams of example components of data center 120. For example, as shown in FIG. 2A, data center 120 may include one or more of the following elements: core routers 210-1 and 210-2 (collectively referred to as "core routers 210" and generically as "core router 210"); aggregation routers 220-1, 220-2, 220-3 and 220-4 (collectively referred to as "aggregation routers 220" and generically as "aggregation router 220"); switches 230-1, 230-2, 230-3, 230-4, 230-5, 230-6, 230-7, and 230-8 (collectively referred to as "switches 230" and generically as "switch 230"); processor (or "processing") racks (PRs) 240-1, 240-2, 240-3, 240-4, 240-5, and 240-6 (collectively referred to as "processor racks 240" and generically as "processor rack 240"); storage racks (SRs) 250-1 and 250-2 (collectively referred to as "storage racks 250" and generically as "storage rack 250"); management devices 260-1 and 260-2 (collectively referred to as "management devices 260" and generically as "management device 260"); security devices 270-1 and 270-2 (collectively referred to as "security devices 270" and generically as "security device 270"); a primary power supply 282; a battery power supply 284; a generator power supply 286; and a main filter 288.

Two core routers 210, four aggregation routers 220, eight switches 230, six processing racks 240, two storage racks 250, two management devices 260, two security devices 270, one primary power supply 282, one battery power supply 284, one generator power supply 286, and one main filter 288 have been illustrated in FIGS. 2A and 2B for simplicity. In practice, there may be more core routers 210, aggregation routers 220, switches 230, processing racks 240, storage racks 250, management devices 260, security devices 270, primary power supplies 282, battery power supplies 284, generator power supplies 286, and main filters 288. Furthermore, data center 120 may include additional types of elements, fewer elements, different elements, or differently arranged elements than are shown in FIGS. 2A and 2B. Also, one or more elements of data center 120 may perform the tasks described as being performed by one or more other elements of data center 120.

Core router 210 may include any device capable of receiving and transmitting traffic via network 110 and via aggregation routers 220. For example, core router 210 may be designed to operate in the Internet backbone and/or in a virtual private network (VPN). Core router 210 may support multiple communication interfaces, and may support routing protocols used in the Internet backbone and/or in VPNs. Core router 210 may forward traffic at high speeds along optical lines of the Internet backbone in order to receive and transmit traffic via network 110.

Aggregation router 220 may include any device capable of receiving traffic from core routers 210 and forwarding the traffic to switches 230. For example, each one of aggregation routers 220 may receive traffic from each one of core routers 210 (e.g., core routers 210-1 and 210-2). Each one of aggregation routers 220 may forward the traffic to/from one or more switches 230. For example, aggregation routers 220-1 and 220-2 may forward traffic to/from switches 230-1 and 230-2 and aggregation routers 220-3 and 220-4 may forward traffic to/from switches 230-7 and 230-8.

Switch 230 may include any device capable of receiving traffic from aggregation routers 220 and/or from other switches 230, and forwarding the traffic to other switches 230, processing racks 240, and/or storage racks 250. Switches 230 may be organized into multiple levels of an Ethernet switching hierarchy. In one example, switches 230-1 and 230-2 may, for example, forward traffic to/from each other and to/from switches 230-3, 230-4, 230-5, and 230-6. Switches 230-3 and 230-4 may forward traffic to/from processor racks 240-1, 240-2, and 240-3. Switches 230-5 and 230-6 may forward traffic to/from processor racks 240-4, 240-5, and 240-6. Switch 230-7 may forward traffic to/from storage rack 250-1. Switch 230-8 may forward traffic to/from storage rack 250-2.

Processing rack 240 may include one or more processing devices that are capable of processing traffic received from switches 230. For example, components of processing rack 240 may execute instances of applications associated with one or more web services. The components of processing rack 240 may use the executed instances of the applications to process the traffic. The components of processing rack 240 may forward information associated with an output from processing the traffic back to a client via switches 230.

Storage rack 250 may include one or more storage devices that are capable of storing data. For example, components of storage rack 250 may store data received from switches 230. The components of storage rack 250 may also retrieve stored data in response to traffic (e.g., requests for data) received via switches. The components of storage rack 250 may transmit the retrieved data back to a particular client via switches 230.

Management device 260 may include one or more devices that determine how to process traffic received by data center 120 and/or control operation of components of processing racks 240 and/or storage racks 250. For example, management device 260 may route traffic to one of processing rack 240, storage rack 250, or another data center 120 based on information associated with the traffic and information associated with power being used by data center 120, which includes management device 260, and/or power being used by the other data center 120. Management device 260 may also control states/operations of components of processing racks 240 and/or storage racks 250 in order to conserve energy, as described further below in reference to FIG. 6.

Security device 270 may include one or more devices that provide one or more different types of security appliances. The security appliances may include, for example, firewall applications, intrusion detection applications, Secure Sockets Layer (SSL) accelerators, antivirus applications, etc. Security device 270 may check traffic for security issues before the traffic is routed to components of processing rack 240 or storage rack 250.

Primary power supply 282 may include one or more devices that receive power from a commercial power supplier and provide the power to other elements of data center 120. For example, primary power supply 282 may receive power from a commercial power supplier via a power grid of a geographic area that includes a location of data center 120. The commercial power supplier may also provide power to other data centers 120, residences, businesses, etc. within the geographic area served by data center 120 via the power grid. Primary power supply 282 may include an AC/DC converter. The AC/DC converter may convert the AC power received via the power grid into, for example, DC power. Primary power supply 282 may provide the DC power to, for example, core router 210, aggregation router 220, switch 230, power rack 240, storage rack 250, management device 260, security device 270, and/or battery power supply 284.

Battery power supply 284 may include one or more devices that act as an uninterruptible power supply (UPS). For example, battery power supply 284 may store a limited amount of power. Battery power supply 284 may start providing power to one or more elements of data center 120 as soon as a power failure occurs. The power failure may occur, for example, when primary power supply 282 stops providing power (e.g., after data center 120 stops receiving power from a commercial power supplier). Battery power supply 284 may provide power for a limited period of time (e.g., until the limited amount of power is used by data center 120 after the power failure). As described further below in reference to FIG. 2B, battery power supply 284 may provide power to fewer elements of data center 120 than primary power supply 282.

In other implementations, data center 120 may include and use flywheels (not shown in FIGS. 2A and 2B) instead of, or in addition to, battery power supply 284. The flywheels may spin and store power during an operation of data center 120. When a power failure occurs, one or more elements of data center 120 may use the power stored by the flywheels.

Generator power supply 286 may include one or more devices and/or generators that generate and provide power. For example, after a power failure occurs, battery power supply 284 may run out of power and, therefore, stop providing power after a limited period of time. As soon as battery power supply 284 stops providing power, generator power supply 286 may generate power and start providing the generated power to one or more elements of data center 120.

In one implementation, as described further below in reference to FIG. 2B, generator power supply 286 may provide power to fewer elements of data center 120 than battery power supply 284. In another implementation, generator power supply 286 may provide power instead of primary power supply 282 when a price of generating the generated power is less than a price of the commercial power. In yet another implementation, the operator of data center 120 may generate the generated power and sell excess generated power to the commercial power supplier when the price of generating the generated power is less than the price of the commercial power or a price of supplying the commercial power. Generator power supply 286 may provide the power via the power grid associated with the commercial power supplier.

Main filter 288 may include one or more devices that facilitate transmission of power to elements of data center 120. For example, main filter 288 may receive power, at a particular point in time, from one of primary power supply 282, battery power supply 284, or generator power supply 286. Main filter 288 may provide the received power (e.g., via vertical risers) to one or more elements of data center 120. In other implementations, main filter 288 may also use grounds for lightning protection to avoid disruptions if lightning strikes data center 120.

FIG. 2B illustrates an example configuration of data center 120 when elements of data center 120 are divided into different categories. In one implementation, management device 260 of data center 120 may categorize elements of data center 120 into a first category 292, a second category 294, and/or a third category 296. In another implementation, management device 260 may categorize one or more elements of data center 120 into a fourth category 298 while data center 120 is processing traffic. In yet another implementation, management device 260 and/or another device of data center 120 may move elements of data center 120 between first category 292, second category 294, third category 296, and/or fourth category 298 based on changing requirements and/or demands of data center 120.

For example, as shown in FIG. 2B, elements of first category 292 may include core routers 210, aggregation routers 220, switches 230-1 and 230-2, management devices 260, and security devices 270. The elements of first category 292 may receive, at different times, power from one of primary power supply 282, battery power supply 284, and generator power supply 286.

As further shown in FIG. 2B, elements of second category 294 may include switches 230-5, 230-6, and 230-8; processor rack 240-6; and storage rack 250-2. The elements of second category 294 may receive, at different times, power only from primary power supply 282 and battery power supply 284. Elements of third category 296 may include switches 230-3, 230-4, and 230-9; processor racks 240-1, 240-3, 240-4, 240-5; and storage rack 250-1. The elements of third category 296 may receive power only from primary power supply 282.

Elements of fourth category 298 may include processor rack 240-2. Management device 260 may place processor rack 240-2 into fourth category 298 in order to conserve energy by, for example, powering down processor devices of processor rack 240-2. Processor rack 240-2, while in fourth category 298, may not receive any power or receive an amount of power from primary power supply 282 that is less than an amount of power being received by any other processor rack 240.

Figure 3:
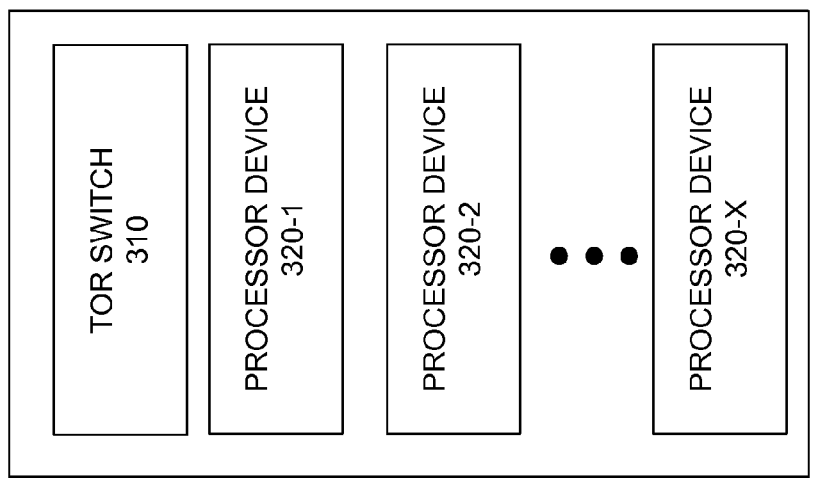
FIG. 3 is a diagram of example components of a processor rack of FIG. 2.

FIG. 3 is a diagram of example components of processor rack 240. As shown in FIG. 3, processor rack 240 may include a top of rack (TOR) switch 310 and processor devices 320-1, 320-2, . . . , 320-X (collectively referred to as "processor devices 320" and individually as "processor device 320"). In practice, processor rack 240 may include additional components, fewer components, different components, or differently arranged components than are shown in FIG. 3. Also, a component of processor rack 240 may perform the tasks described as being performed by another component of processor rack 240.

TOR switch 310 may include a network device, such as, for example, a small, low port, count switch. For example, TOR switch 310 may receive traffic that is routed to processing rack 240, which includes TOR switch 310, from one or more switches 230. TOR switch 310 may forward the received traffic to one of processor devices 320. TOR switch 310 may further receive processed traffic from processor devices 320. TOR switch 310 may forward the processed traffic to switches 230.

Processor device 320 may include one or more processors that execute different instances of applications that provide services to client devices (not shown). The services may include, for example, one or more of a service to allow a user to access their email account; a service to receive media files; a service that execute a virtual machine for a particular application; a service that provides a program guide that has local information for a particular geographic area; etc. For example, processor device 320 may receive traffic from TOR switch 310. Processor device 320 may execute an instance of one of the applications to provide a particular service associated with the traffic. Processor device 320 may use the executed instance to process the traffic. Processor device 320 may transmit the processed traffic to TOR switch 310.

Figure 4:
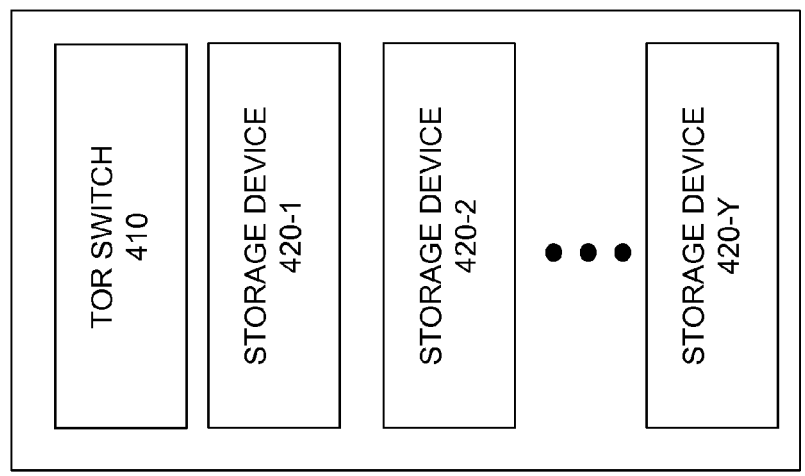
FIG. 4 is a diagram of example components of a storage rack of FIG. 2.

FIG. 4 is a diagram of example components of storage rack 250. As shown in FIG. 4, storage rack 250 may include a TOR switch 410 and storage devices 420-1, 420-2, . . . , 420-Y (collectively referred to as "storage devices 420" and individually as "storage device 420"). In practice, storage rack 250 may include additional components, fewer components, different components, or differently arranged components than are shown in FIG. 4. Also, a component of storage rack 250 may perform the tasks described as being performed by another component of storage rack 250.

TOR switch 410, like TOR switch 310, may include a network device, such as, for example, a small, low port, count switch. For example, TOR switch 410 may receive traffic that is routed to storage rack 250, which includes TOR switch 410, from one or more switches 230. TOR switch 410 may forward the received traffic to one of storage devices 420. TOR switch 310 may also forward information stored in storage devices 420 to switches 230.

Storage device 420 may include one or more devices that store and provide information. In one implementation, storage device 420 of storage rack 250 of a particular data center 120 may store information that is also stored by one or more other data centers 120. For example, storage device 420 may receive information (e.g., backup files, media files, etc.) and store the information. Thereafter, storage device 420 may receive traffic that includes a request for the information. Storage device 420 may retrieve and provide the information in response to the request. Hereafter, any reference to processor rack 240 may also apply to storage rack 250.

Figure 5:
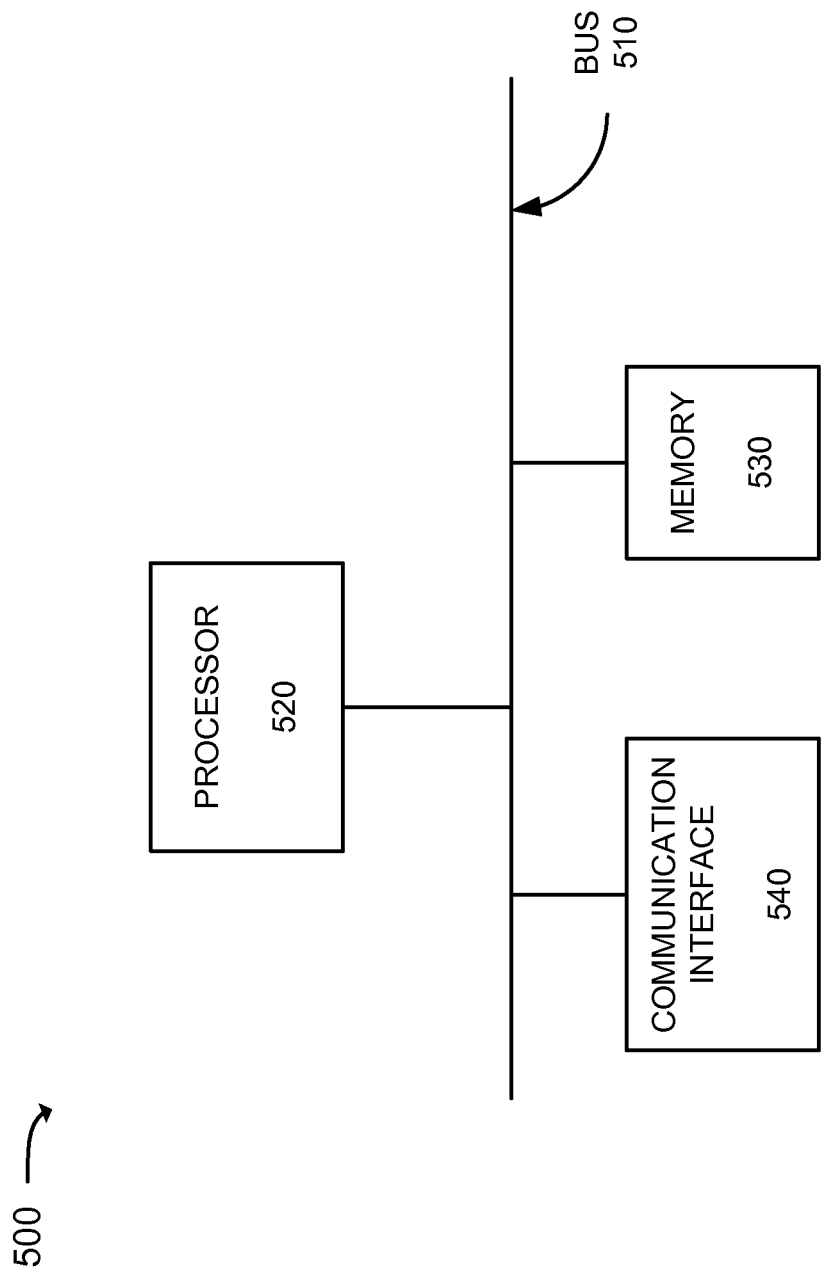
FIG. 5 is a diagram of example components of one or more devices of FIGS. 2-4.

FIG. 5 is a diagram of example components of a device 500 that may be associated with core router 210, aggregation router 220, switch 230, management device 260, security device 270, primary power supply 282, battery power supply 284, generator power supply 286, main filter 288, TOR switch 310, processor device 320, TOR switch 410, and storage device 420. Each of core router 210, aggregation router 220, switch 230, management device 260, security device 270, primary power supply 282, battery power supply 284, generator power supply 286, main filter 288, TOR switch 310, processor device 320, TOR switch 410, and storage device 420 may include one or more devices 500.

As shown in FIG. 5, device 500 may include a bus 510, a processor 520, a memory 530, and a communication interface 540. In another implementation, device 500 may include additional components, fewer components, different components, or differently arranged components than are shown in FIG. 5. For example, device 500 may include input and output components.

Bus 510 may include a path that permits communication among the components of device 500. Processor 520 may include one or more processors, microprocessors, and/or processing logic that may interpret and execute instructions. In other implementations, processor 520 may be implemented as or include one or more application specific integrated circuits (ASICs), field programmable gate arrays (FPGAs), or the like.

Memory 530 may include a random access memory (RAM), a read only memory (ROM) device, a magnetic and/or optical recording medium and its corresponding drive, and/or another type of static and/or dynamic storage device that may store information and instructions for execution by processor 520.

Communication interface 540 may include any transceiver-like mechanism that enables device 500 to communicate with other devices and/or networks. For example, communication interface 540 may include a network card, such as a network interface card (NIC) and/or an Ethernet device, such as an Ethernet NIC.

As described herein, device 500 may perform certain operations. Device 500 may perform these operations in response to processor 520 executing software instructions (e.g., computer program(s)) contained in a computer-readable medium, such as memory 530, a secondary storage device (e.g., hard disk, CD-ROM, etc.) or other forms of RAM or ROM. A computer-readable medium may be defined as a non-transitory memory device. A memory device may include space within a single physical memory device or spread across multiple physical memory devices. The software instructions may be read into memory 530 from another computer-readable medium, such as a data storage device, or from another device via communication interface 540. The software instructions contained in memory 530 may cause processor 520 to perform processes described below. Alternatively, hardwired circuitry may be used in place of or in combination with software instructions to implement processes described herein. Thus, implementations described herein are not limited to any specific combination of hardware circuitry and software.

Figure 6:
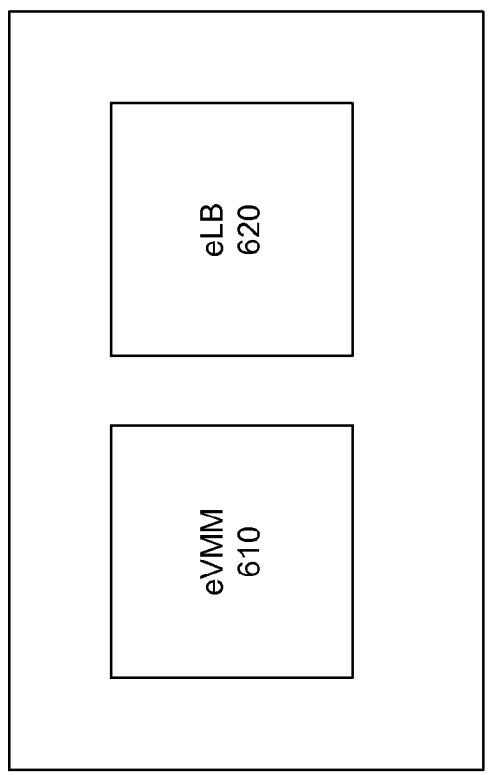
FIG. 6 is a diagram of example functional components of a management device of FIG. 2.

FIG. 6 is a diagram of example functional components of management device 260. Each one of the functional components may correspond to one or more hardware or a combination of software and hardware components. As shown in FIG. 6, management device 260 may include an enhanced virtual machine manager (eVMM) 610 and an enhanced load balancer (eLB) 620. In other implementations, management device 260 may include additional functional components, fewer functional components, different functional components, and/or differently arranged functional components than are shown in FIG. 6. Alternatively, or additionally, one or more functional components of management device 260 may perform one or more other tasks described as being performed by one or more other functional components of management device 260.

eVMM 610 and/or eLB 620 may route traffic received by data center 120 based on information associated with current states and expected future states of power in data center 120 that includes eVMM 610 and/or eLB 620 and/or one or more other data centers 120. eVMM 610 may handle traffic associated with virtual machines (VMs) (i.e., traffic for which VMs are necessary to process the traffic). A VM is a software implementation of a machine (e.g., processor of a computer) that executes programs like a physical machine. The VM may execute a process/program to process received traffic. eVMM 610 may store/maintain information about (i.e., keep track of) all processes currently being run in data centers 120. eLB 620 may route traffic to processing racks 240, to storage racks 250, and/or to other data centers 120. eVMM 610 may direct another data center 120 to execute an instance of an application before eLB 620 starts routing the traffic to the other data center 120. The other data center 120 may use the executed instance of the application to process the traffic.

For example, switch 230, of data center 120-1, may receive traffic from aggregation router 220, of data center 120-1. eLB 620, of data center 120-1, may determine how to route the traffic based on whether an existing process is associated with the traffic, a type of the traffic (e.g., application/web service associated with the traffic), a class of the traffic (e.g., a Service Level Agreement (SLA) associated with the traffic and/or the application), whether a power failure has occurred in data center 120-1, cost of energy for data center 120-1 and for other data centers 120, etc.

eLB 620 may route traffic to a particular processing rack 240 and/or to a particular storage rack 250 when, for example, data center 120-1 is continuing to receive commercial power. eLB 620 may, for example, select processing rack 240-6, of data center 120-1, that is in second category 294 (FIG. 2B) for a class of traffic associated with services that optimally require continuous processing and are not interruptible (e.g., video sessions, voice conferencing sessions, etc.). eLB 620 may select a processing rack 240 (e.g., processing rack 240-4) that is in third category 296 (FIG. 2B) for a class of traffic associated with services that are interruptible for short periods of time (e.g., providing generic web server pages for a web site, email services, etc.).

eLB 620 may route traffic from one data center 120 (e.g., data center 120-1) to a different data center 120 (e.g., data center 120-2) based on information associated with the traffic, information associated with power being used by data centers 120 (e.g., information that battery backup power in data center 120-1 is projected to exhaust within a particular period of time), and/or information associated with capacities of data centers 120. For example, in one implementation, eLB 620 may route traffic to data center 120-2 when, for example, a commercial power failure is occurring in data center 120-1 and battery backup power is projected to exhaust imminently (e.g., within the particular period of time). In another implementation, eLB 620 may route traffic to data center 120-2 when eLB 620 determines that the operator may wish to conserve energy and/or save money by processing the traffic at a data center 120 other than data center 120-1. This may occur when, for example, data center 120-2 is receiving commercial power at a lower price, at a particular point in time, than a price of commercial power being received by data center 120-1. In this implementation, data center 120-1 may place one or more processor racks 240 into fourth category 298, as described above in reference to FIG. 2B and further below. In yet another implementation, eLB 620 may route traffic to data center 120-2 when data center 120-2 has more free capacity than data center 120-1 to process the traffic.

eVMM 610 may also control components of processing rack 240 and/or storage rack 250 in order to conserve energy. For example, eVMM 610 may determine that data center 120 has extra processing capacity and/or storage capacity that are not being used (and are not likely to be used in the near future, e.g., within a particular period of time). In response, in one implementation, eVMM 610 may select one or more of processing racks 240 that are not being used. In another implementation, eVMM 610 may move virtual machines from one or more selected processing racks 240 to one or more other processing racks 240. eVMM 610 may place the components of the selected processing racks 240 into a particular state (e.g., fourth category 298) to allow data center 120 to conserve energy by using less power. The particular state may include a low power state, a stand-by state, a hibernation state, an off state, etc. Placing the selected processing racks 240 into the particular state may include categorizing the selected processing rack (e.g., processing rack 240-2) into fourth category 298 (FIG. 2B).

Figure 7:
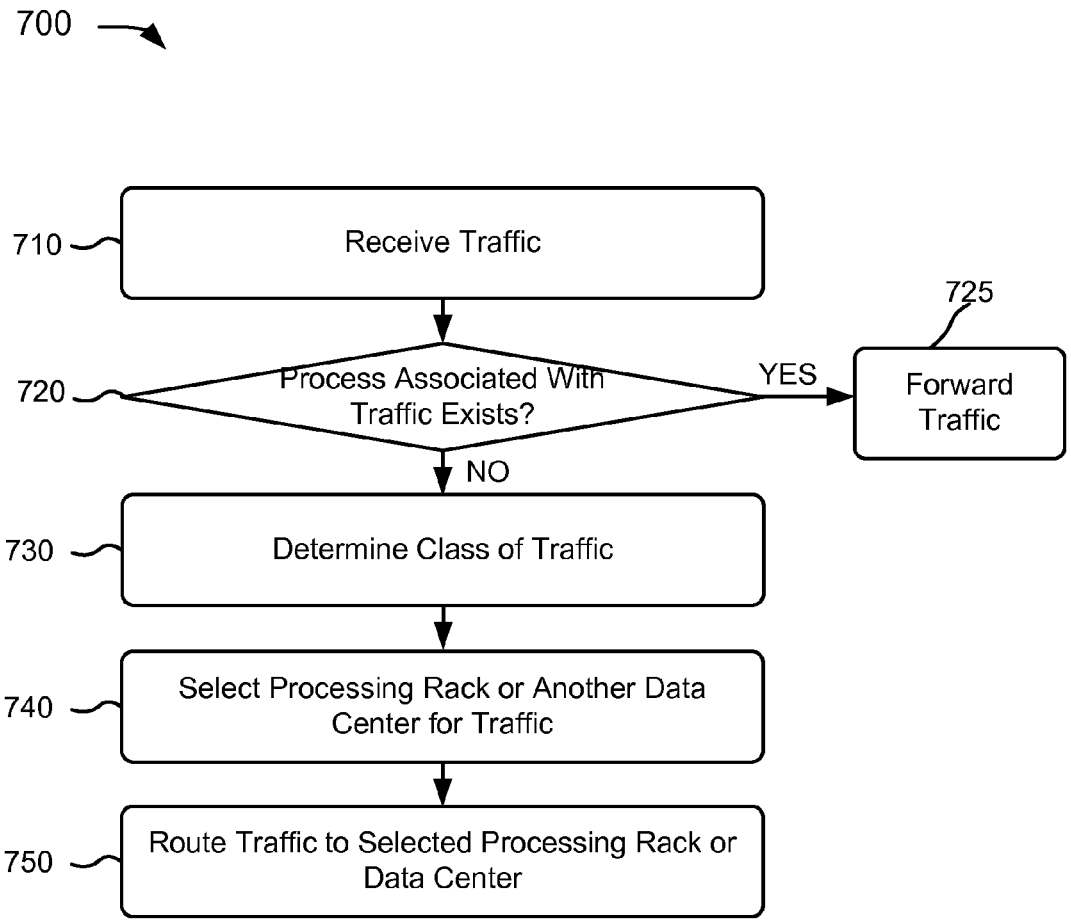
FIG. 7 is a flow chart of an example process for routing traffic.

FIG. 7 is a flowchart of an example process 700 for routing traffic. In one implementation, management device 260 may perform process 700. Alternatively, process 700 may be performed by one or more other devices, alone or in combination with management device 260.

As shown in FIG. 7, process 700 may include receiving traffic (block 710). For example, data center 120 may receive traffic from a remote computer terminal. Core router 210, aggregation router 220, and/or one or more switches 230 may route the traffic via data center 120. Management device 260, associated with one of switches 230, may receive the traffic and/or information associated with the traffic.

Process 700 may further include determining whether a process associated with the traffic exists (block 720). For example, management device 260 may store and/or have access to information about all processes currently being executed by one or more data centers 120. Management device 260 may determine whether the traffic is associated with one of the processes executed within the same data center 120, which includes management device 260, or within another data center 120.

If the process associated with the traffic exists (block 720—YES), process 700 may include forwarding the traffic (block 725). For example, management device 260 may determine that a particular data center 120 (e.g., the same data center 120 or the other data center 120), components of a particular processing rack 240, or a particular processor device 320 (FIG. 3) is currently executing the process (e.g., a VM) associated with the traffic. Management device 260 may forward/route the traffic to the particular data center 120, to the components of the particular processing rack 240, and/or to the VM in the particular processor device 320.

If a process associated with the traffic does not exist (block 720—NO), process 700 may include determining a class of the traffic (block 730). For example, the traffic may include an initial request for a particular computing or storage service. Management device 260 may determine a class of the traffic based on a type of the particular service and/or other information associated with the traffic (e.g., a SLA associated with the remote computer terminal that is the source of the traffic).

Process 700 may also include selecting a processing rack or another data center for the traffic (block 740) and routing the traffic to the selected processing rack or the other data center. (block 750). For example, management device 260 may select a particular processing rack 240 based on the class of the traffic. Selecting a particular processing rack 240 may include selecting a particular process running on processor device 320 of the particular processing rack 240. Management device 260 may select processing rack 240 (e.g., processing rack 240-6) that is included in second category 294 (FIG. 2B) when the class of the traffic indicates that the traffic is high priority traffic (e.g., the web service requires uninterrupted, continuous, processing of the traffic). Management device 260 may select processing rack 240 (e.g., processing rack 240-4) that is included in third category 296 when the class of the traffic indicates that the traffic is low priority traffic (e.g., the processing of the traffic may be interrupted for a short period of time). Management device 260 may route the traffic to the selected processing rack 240.

In another example, assume that the operator is currently paying less for commercial power at data center 120-2 than at data center 120-1. Before selecting processing rack 240 of data center 120-1, as described above, management device 260 of data center 120-1 may determine that the operator may minimize energy expenses by processing the traffic at data center 120-2 instead of processing the traffic by using processing rack 240 of data center 120-1. To minimize the energy expenses, management device 260 may select data center 120-2 instead of selecting processing rack 240 of data center 120-1. After selecting data center 120-2, management device 260 may route the traffic to data center 120-2. Furthermore, management device 260 may place processing rack 240-2, of data center 120-1 into fourth category 298, as described above.

Figure 8:
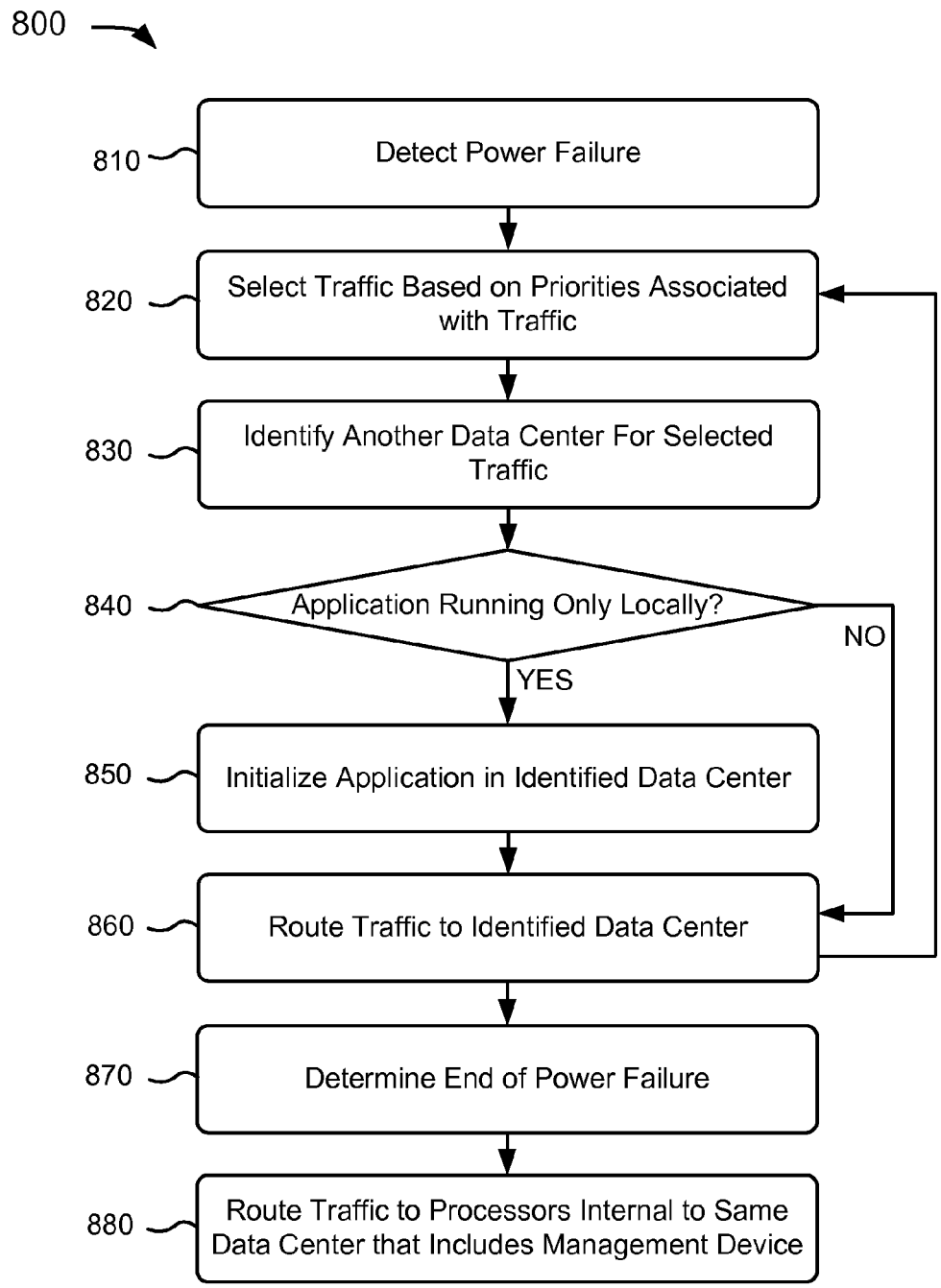
FIG. 8 is a flow chart of an example process for routing traffic after detecting a power failure.

FIG. 8 is a flowchart of an example process 800 for routing traffic after detecting a power failure. In one implementation, management device 260 may perform process 800. Alternatively, process 800 may be performed by one or more other devices, alone or in combination with management device 260.

As shown in FIG. 8, process 800 may include detecting a power failure (block 810). For example, assume that data center 120-1 stops receiving power from a commercial power supplier (i.e., elements of data center 120-1 stop receiving power from primary power supply 282). Battery power supply 284 may start providing power to elements that are included in first category 292 and second category 294. Simultaneously, management device 260 may detect that a power failure has occurred.

Process 800 may further include selecting traffic based on priorities associated with the traffic (block 820). For example, management device 260 may store information about traffic (e.g., sessions) being processed by data center 120-1, including priorities associated with the traffic. Components of processing racks 240 (e.g., processing rack 240-6), which are included in second category 294 (e.g., that receive power from battery power supply 284), may process traffic with a highest priority (e.g., associated with a class of traffic that has the highest priority) when the power failure is detected. Components of processing racks 240 (e.g., processing racks 240-1, 240-3, 240-4, and 240-5), which are included in third category 296 (e.g., that do not receive power from battery power supply 284), may process traffic with a low priority (e.g., associated with a class of the traffic that has a lower priority than the highest priority) when the power failure is detected. In such an example, management device 260 may select traffic with the highest priority.

Process 800 may also include identifying another data center 120 for the selected traffic (block 830). For example, management device 260 may identify data center 120-2 based on a price of commercial power received by data center 120-2 and/or a current amount and a predicted future amount of unused processing capacity of data center 120-2. In one example, management device 260 may select data center 120-2 when data center 120-2 receives commercial power at a price that is lower than or equal to prices of commercial power received by other data centers 120. In another example, management device 260 may select data center 120-2 when data center 120-2 has a current amount of unused processing capacity that is equal to or greater than current amounts of unused processing capacities of any other suitable data centers 120.

In yet another example, management device 260 may project a predicted future amount of unused processing capacity of data center 120-2 based on whether data center 120-2 is expected to receive a substantial number of traffic transfers from other data centers 120 during same period of time. Data center 120-1 may determine that data center 120-2 is expected to receive the substantial number of traffic transfers when the other data centers 120 were (likely) affected by the same power failure that is affecting data center 120-1 (e.g., when the other data centers 120 are located within the same geographic area and/or are connected to same power grid as data center 120-1). Management device 260 may select data center 120-2 when the predicted future amount of unused processing capacity of data center 120-2 is equal to or less than current and/or predicted future amounts of unused processing capacities of any other suitable/available data centers 120.

Process 800 may also include determining whether an application is executing only locally (block 840). For example, an instance of a particular application needs to be executed in order to process the selected traffic. Management device 260 may determine that only data center 120-1, and no other data centers 120, is executing the particular application (e.g., a program guide that has local information for a particular geographic area). In one implementation, management device 260 may determine that the particular application is executing only locally when data center 120-1 is the only one of data centers 120 that normally executes the particular application. In another implementation, management device 260 may determine that the particular application is executing only locally when no other available data centers 120 normally execute the particular application.

If the application is executing only locally (block 840—YES), process 800 may include initializing the application in the identified data center 120 (block 850). For example, eVMM 610 of management device 260 may transmit instructions to data center 120-2 for components of one of processing racks 240 to initialize/execute one or more instances of the particular application. Prior to the power failure, (the identified) data center 120-2 may have received communication regarding a database associated with the particular application, which is journaled by data center 120-2 during, for example, a previous backup of the database. Initializing the application may include using the database.

If the application is not running only locally (block 840—NO) or after initializing the application in the identified data center 120 (block 850), process 800 may include routing the selected traffic to the identified data center 120 (block 860). For example, management device 260 may distribute the selected traffic to data center 120-2 by routing the traffic from data center 120-1 to data center 120-2 by using the devices in, for example, first category 292 (FIG. 2B). Thereafter, in one implementation, data center 120-2 may establish a direct connection with the remote computer terminal that is the source of the selected traffic. Management device 260 may continue distributing the selected traffic from data center 120-1 to other data centers 120 (blocks 820-860) until all of the selected traffic of data center 120-1 is distributed to the other data centers 120 and/or until an end of the power failure is determined.

Process 800 may also include determining an end of a power failure (block 870). For example, data center 120-1 may again begin receiving commercial power via primary power supply 282. Thereafter, management device 260 may begin determining whether an end of the power failure has occurred or whether the receipt of the commercial power is a temporary restoration. Management device 260 may determine whether the end of the power failure has occurred based on historical patterns, instructions from the operator of data center 120-1, and/or other information associated with the restoration of the receipt of the commercial power via primary power supply 282.

Process 800 may also include routing traffic to processors internal to the same data center that includes the management device (block 880). For example, after determining that the end of the power failure has occurred, management device 260 may gradually reroute the selected traffic to components of processing racks 240 of data center 120-1, which includes management device 260 that is rerouting the selected traffic. Management device 260 may reroute the traffic back to data center 120-1 in an opposite order from which the traffic was selected based on priority. In other words, management device 260 may first route the traffic with the lowest priority back to processing rack 240 of data center 120-1. In some implementations, management device 260 may transmit requests to the other data centers to return the traffic before rerouting the traffic back to processing racks 240 of data center 120-1.

The foregoing description of implementations provides illustration and description, but is not intended to be exhaustive or to limit the possible implementations to the precise form disclosed. Modifications and variations are possible in light of the above teachings or may be acquired from practice.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set. No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving traffic;
determining a class of traffic, associated with the traffic, corresponding to interruptible traffic or uninterruptible traffic;
selecting, based on the associated class of traffic, a processor device of a first data center, wherein, when the associated class of traffic corresponds to uninterruptible traffic, the selected processor device receives power and backup power, and when the associated class of traffic corresponds to interruptible traffic, the selected processor device receives the power and not the backup power;
routing the traffic to the selected processor device while the first data center receives the power;
detecting, by a device of the first data center, a power failure associated with the first data center when the first data center stops receiving the power;
identifying, by the device, a second data center; and
routing, by the device, the traffic to the second data center.

2. The method of claim 1, where the first data center receives the power via a first power grid associated with a first power supplier, and
where the second data center receives the power via a second power grid associated with the first power supplier or a second power supplier.

3. The method of claim 1, further comprising:
projecting, after detecting the power failure, that a backup power source of the first data center is to exhaust within a particular period of time, where the traffic is routed to the second data center after determining that the backup power source is to exhaust within the particular period of time.

4. The method of claim 3, further comprising:
determining an end of the power failure;
receiving, by the first data center and after determining the end of the power failure, additional traffic; and
routing the additional traffic to the selected processor device.

5. The method of claim 1, further comprising:
determining, by the device, whether the second data center is executing an application required to process the traffic; and
initializing, by the device, the application in the second data center when the second data center is not executing the application.

6. The method of claim 1, further comprising:
selecting, before identifying the second data center, the traffic based on a priority associated with the traffic, where the priority of the traffic is higher than priorities of other traffic to be processed by the first data center.

7. The method of claim 6,
where the first data center comprises a first processing rack and a second processing rack,
where components of the first processing rack receive the power and the backup power,
where components of the second processing rack receive only the power, and
where the traffic is assigned to the components of the first processing rack.

8. A network device comprising:
a transceiver;
one or more memories storing instructions; and
one or more processors to execute the instructions to:
receive traffic via the transceiver,
determine a class of traffic, associated with the traffic, corresponding to interruptible traffic or uninterruptible traffic,
select, based on the associated class of traffic, a processor device of a first data center, wherein, when the associated class of traffic corresponds to uninterruptible traffic, the selected processor device receives power and backup power, and when the associated class of traffic corresponds to interruptible traffic, the selected processor device receives the power and not the backup power,
route the traffic to the selected processor device while the first data center receives the power,
detect a power failure associated with the first data center when the first data center stops receiving the power,
identify a second data center, and
route the traffic to the second data center.

9. The network device of claim 8, wherein the first data center receives the power via a first power grid associated with a first power supplier, and the second data center receives the power via a second power grid associated with the first power supplier or a second power supplier.

10. The network device of claim 8, the one or more processors to further execute the instructions to:
project, after detecting the power failure, that a backup power source of the first data center is to exhaust within a particular period of time, wherein the traffic is routed to the second data center after projecting that the backup power source is to exhaust within the particular period of time.

11. The network device of claim 10, the one or more processors to further execute the instructions to:
determine an end of the power failure;
receive, by the first data center and at the end of the power failure, additional traffic; and
route the additional traffic to the selected processor device.

12. The network device of claim 8, the one or more processors to further execute the instructions to:
determine whether the second data center is executing an application required to process the traffic; and
initialize the application in the second data center when the second data center is not executing the application.

13. The network device of claim 8, the one or more processors to further execute the instructions to:
select, before identifying the second data center, the traffic based on a priority associated with the traffic, wherein the priority of the traffic is higher than priorities of other traffic to be processed by the first data center.

14. A non-transitory computer-readable storage medium, comprising computer-executable instructions for causing one or more processors executing the computer-executable instructions to:
receive traffic via a transceiver;
determine a class of traffic, associated with the traffic, corresponding to interruptible traffic or uninterruptible traffic;

select, based on the associated class of traffic, a processor device of a first data center, wherein, when the associated class of traffic corresponds to uninterruptible traffic, the selected processor device receives power and backup power, and when the associated class of traffic corresponds to interruptible traffic, the selected processor device receives the power and not the backup power;

route the traffic to the selected processor device while the first data center receives the power;

detect a power failure associated with the first data center when the first data center stops receiving the power;

identify a second data center; and route the traffic to the second data center.

15. The non-transitory computer-readable storage medium of claim 14, wherein the first data center receives the power via a first power grid associated with a first power supplier, and the second data center receives the power via a second power grid associated with the first power supplier or a second power supplier.

16. The non-transitory computer-readable storage medium of claim 14, the instructions further causing one or more processors executing the computer-executable instructions to:

project, after detecting the power failure, that a backup power source of the first data center is to exhaust within a particular period of time, wherein the traffic is routed to the second data center after projecting that the backup power source is to exhaust within the particular period of time.

17. The non-transitory computer-readable storage medium of claim 16, the instructions further causing one or more processors executing the computer-executable instructions to:

determine an end of the power failure;

receive, by the first data center and at the end of the power failure, additional traffic; and route the additional traffic to the selected processor device.

18. The non-transitory computer-readable storage medium of claim 14, the instructions further causing one or more processors executing the computer-executable instructions to:

determine whether the second data center is executing an application required to process the traffic; and initialize the application in the second data center when the second data center is not executing the application.

19. The non-transitory computer-readable storage medium of claim 14, the instructions further causing one or more processors executing the computer-executable instructions to:

select, before identifying the second data center, the traffic based on a priority associated with the traffic, wherein the priority of the traffic is higher than priorities of other traffic to be processed by the first data center.

* * * * *